US012115628B2

(12) United States Patent
Doroslovac et al.

(10) Patent No.: US 12,115,628 B2
(45) Date of Patent: Oct. 15, 2024

(54) ANTI-SLIP HEX ALLEN TOOL

(71) Applicants: Ruth Doroslovac, Port Washington, OH (US); Robert Doroslovac, Massillon, OH (US); George Doroslovac, Port Washington, OH (US)

(72) Inventors: Ruth Doroslovac, Port Washington, OH (US); Robert Doroslovac, Massillon, OH (US); George Doroslovac, Port Washington, OH (US)

(73) Assignee: BGD Unlimited, LLC, Massillon, OH (US)

( * ) Notice: Subject to any disclaimer, the term of this patent is extended or adjusted under 35 U.S.C. 154(b) by 322 days.

(21) Appl. No.: 17/842,089

(22) Filed: Jun. 16, 2022

(65) Prior Publication Data

US 2022/0305629 A1 Sep. 29, 2022

Related U.S. Application Data

(63) Continuation-in-part of application No. 17/078,280, filed on Oct. 23, 2020, now Pat. No. 11,518,009.

(51) Int. Cl.
*B25B 23/00* (2006.01)
*B25B 15/00* (2006.01)

(52) U.S. Cl.
CPC ........ *B25B 23/0035* (2013.01); *B25B 15/008* (2013.01)

(58) Field of Classification Search
CPC . B25B 15/004; B25B 15/008; B25B 23/0035; B25B 23/105; B25B 23/108
See application file for complete search history.

(56) References Cited

U.S. PATENT DOCUMENTS

| | | | | |
|---|---|---|---|---|
| 4,105,056 | A | 8/1978 | Arnn | |
| 6,152,000 | A | 11/2000 | Mowins | |
| 8,302,255 | B2 | 11/2012 | Lin | |
| 8,640,575 | B2 | 2/2014 | Huang | |
| D859,945 | S * | 9/2019 | Kukucka | D8/86 |
| D889,224 | S * | 7/2020 | Kukucka | D8/86 |
| 10,780,556 | B2 * | 9/2020 | Kukucka | B25B 15/004 |
| 11,154,969 | B2 * | 10/2021 | Kukucka | B25B 27/18 |
| 11,396,089 | B2 * | 7/2022 | Kukucka | B25B 13/065 |
| D973,461 | S * | 12/2022 | Su | D8/86 |
| 11,725,682 | B2 * | 8/2023 | Bongartz | F16B 23/0053 29/525.11 |
| D1,016,588 | S * | 3/2024 | Su | D8/86 |

(Continued)

*Primary Examiner* — David B. Thomas
(74) *Attorney, Agent, or Firm* — Harpman & Harpman

(57) ABSTRACT

A hex headed bit and socket for enhanced non-slip application of torque force having a hex head with contoured fastener engagement surface channels in the respective alternating flat tool engagement sides and tapered step end engagement surfaces with fastener engagement edges. The contoured channels are tapered both transversely and longitudinally and extend in angular inclination across hex head bit flat side. Alternate alternating recess areas in a hexagonal insertion bit defining pairs of spaced parallel vertical engagement edges. The defined primary channel lateral edges and correspondingly end engagement surface engagement edges and vertical engagement edges embed themselves during rotational engagement within the so engaged fastener pulling the hex head bit into the engaged fastener imparting enhanced translateral points of tool engagement.

9 Claims, 13 Drawing Sheets

(56) References Cited

U.S. PATENT DOCUMENTS

| | | | | |
|---|---|---|---|---|
| 2022/0203507 | A1* | 6/2022 | Su | B25B 15/008 |
| 2022/0281085 | A1* | 9/2022 | Kukucka | B25B 15/004 |
| 2023/0321799 | A1* | 10/2023 | Su | B25B 15/004<br>81/436 |
| 2023/0381931 | A1* | 11/2023 | Pistor | B25B 15/007 |

* cited by examiner

ANTI-SLIP HEX ALLEN TOOL

This is a continuation in part application of Ser. No. 17/078,280 filed Oct. 23, 2020.

BACKGROUND OF THE INVENTION

1. Technical Field

This invention is directed to hex headed bits for the use with hex headed fasteners as an anti-slip multi-directional drive bit for driving and removing of hex headed fasteners. Such tool bits known and used in the art are defines as six sided flat surfaces for engagement and correspondingly configured receptacles for rotation to tighten and loosen as needed. Such fastener bolt designs may be compromised during use due to metal fatigue, rust and general abuse imparted by improper tool use thus making them difficult to engage by a typical hex headed tool.

2. Description of Prior Art

Prior art hex wrench and bit tool configurations can be seen in the following U.S. Pat. Nos. 4,105,056, 6,152,000, 8,302,255 and 8,640,575.

In U.S. Pat. No. 4,105,056, a non-slip screwdriver can be seen having a grooved foot portion from the driver blade with oppositely disposed parallel engagement grooves there across defining recessed surfaces.

U.S. Pat. No. 6,152,000 is directed to a driver bit and driver tool having a plurality of projections formed on at least one surface of the fastener engagement shank portion to enhance the tool to fastener registration engagement.

U.S. Pat. No. 8,302,255 illustrates a hexagonal wrench head with longitudinal groove adjacent the respective side surfaces edge intersections there along.

U.S. Pat. No. 8,640,575 discloses a ball end hex wrench wherein a groove is formed within the contoured multiple sides longitudinally.

SUMMARY OF THE INVENTION

The present invention provides a driver bit for engaging and maintaining efficient contact within a fastener to transfer rotational force from the drive bit to the fastener while maintaining proper engagement therewith. Contoured tapered engagement surface channel cuts within alternating flat hex bit surfaces define directional engagement edges. Tapered end surface cuts on each of corresponding hex bit end surface define directional radial engagement edges. Both of the engagement edge configurations dig into the corresponding vertical and horizontal registering fastener surfaces pulling the driver bit down within the fastener maintaining fastener engagement during rotational torque input.

DETAILED DESCRIPTION OF THE INVENTION

Referring to FIGS. 1-7 of the drawings, a first anti-slip socket box end hex bit 10 of the invention can be seen having a cylindrical screw bit body 11 with a hex shank fastener engagement socket portion 12 extending therefrom.

Figure 1:
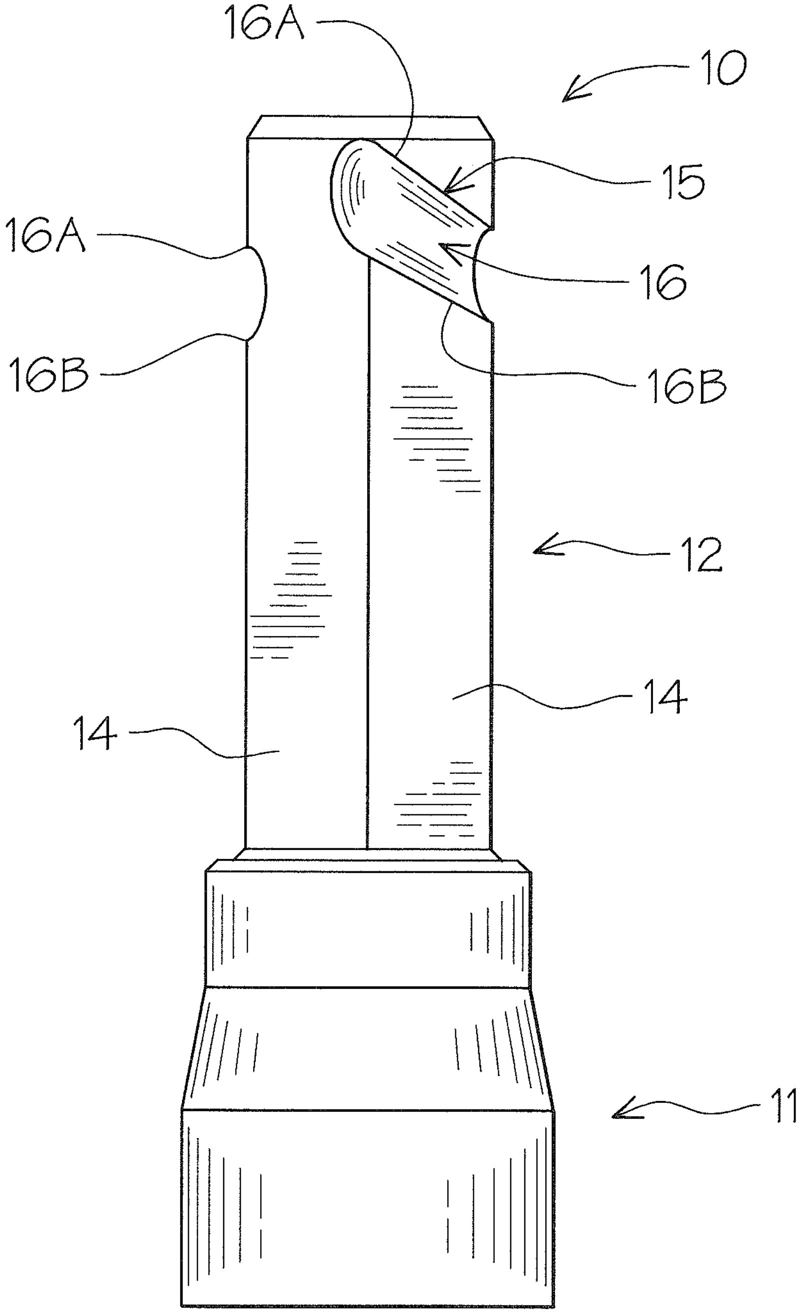
FIG. 1 is an enlarged front elevational view of the anti-slip hex socket bit of the invention.
Figure 2:
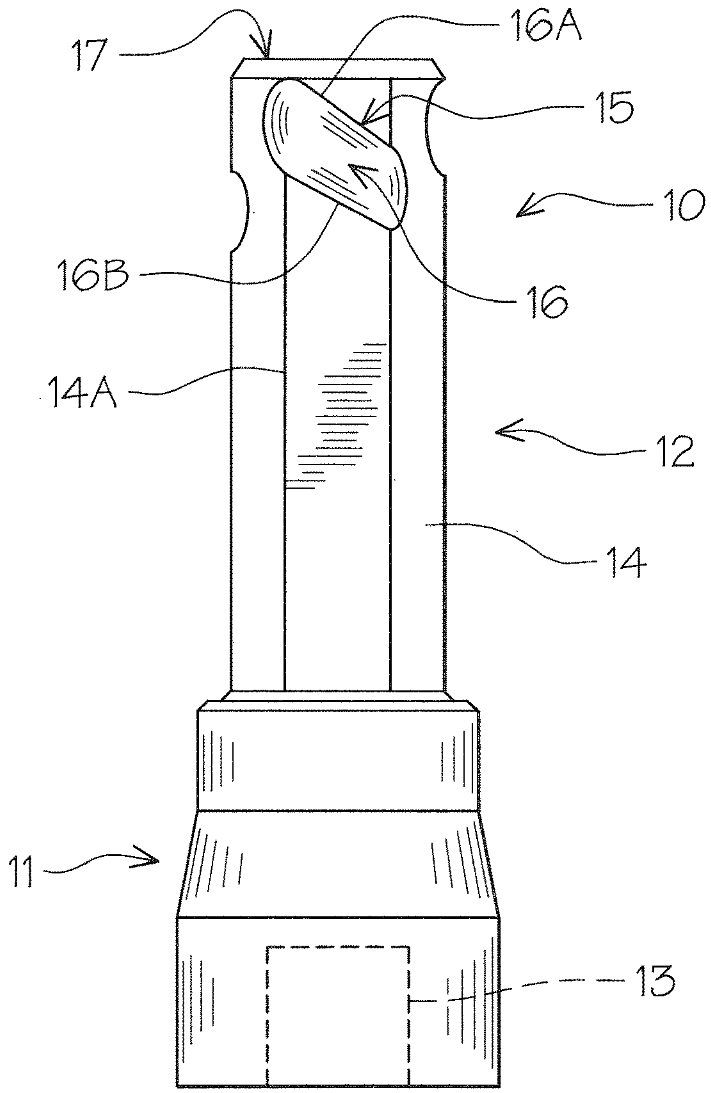
FIG. 2 is an enlarged rear elevational view thereof.
Figure 3:
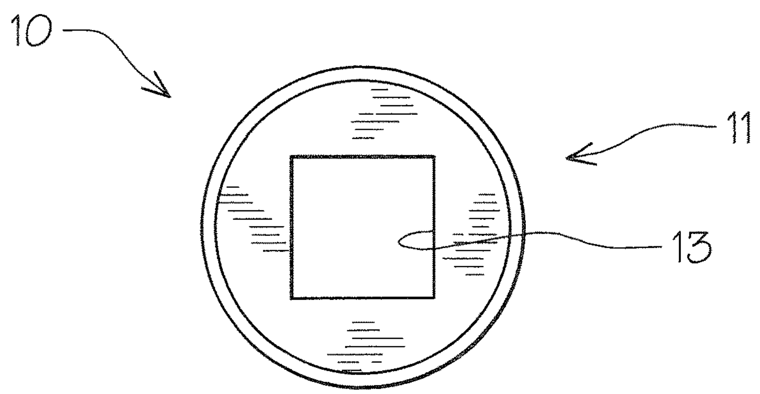
FIG. 3 is an enlarged bottom plan view thereof.
Figure 4:
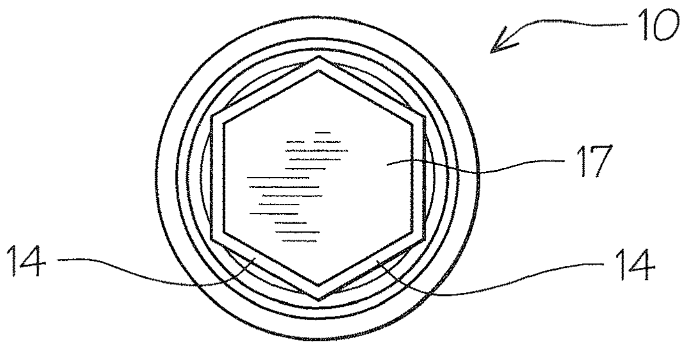
FIG. 4 is an enlarged top plan view thereof.
Figure 5:
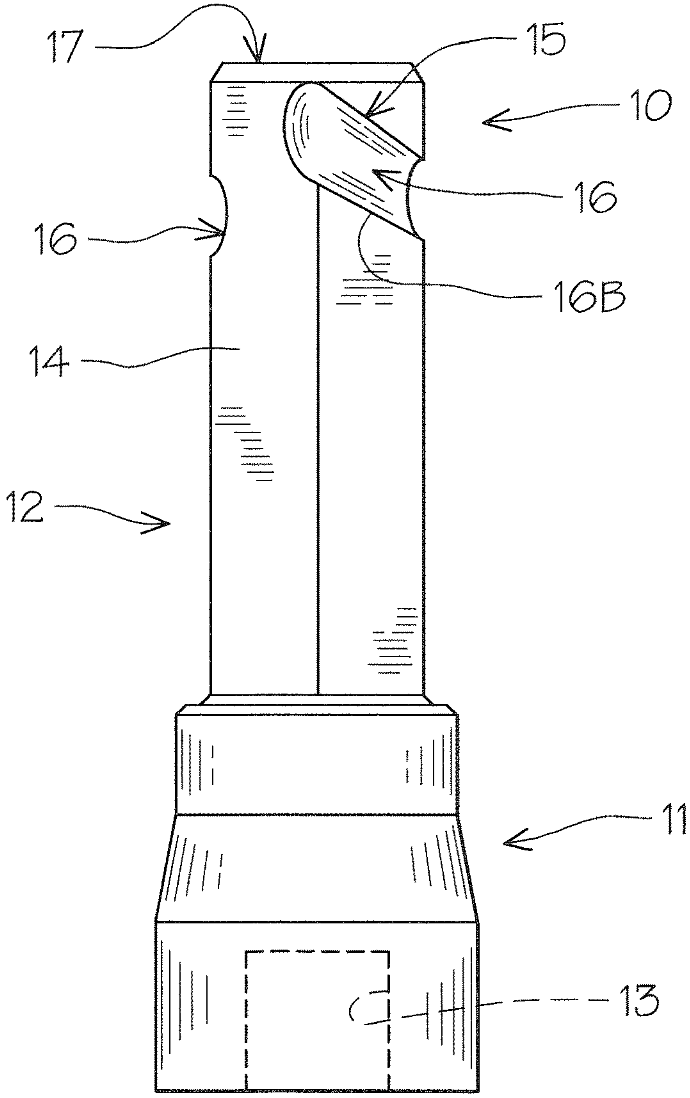
FIG. 5 is an enlarged side elevational view of the anti-slip hex socket bit of the invention.
Figure 6:
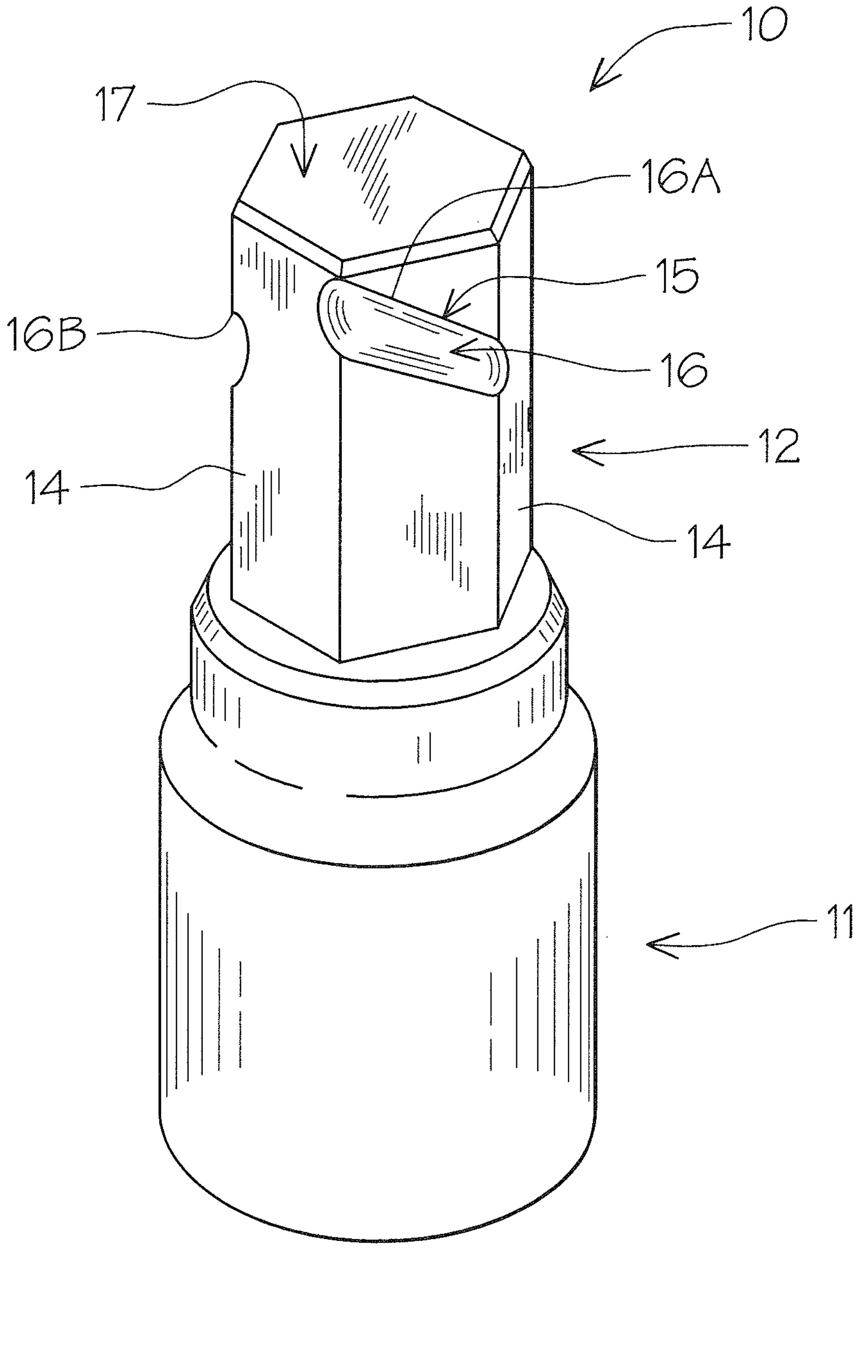
FIG. 6 is an enlarged top perspective view thereof.
Figure 7:
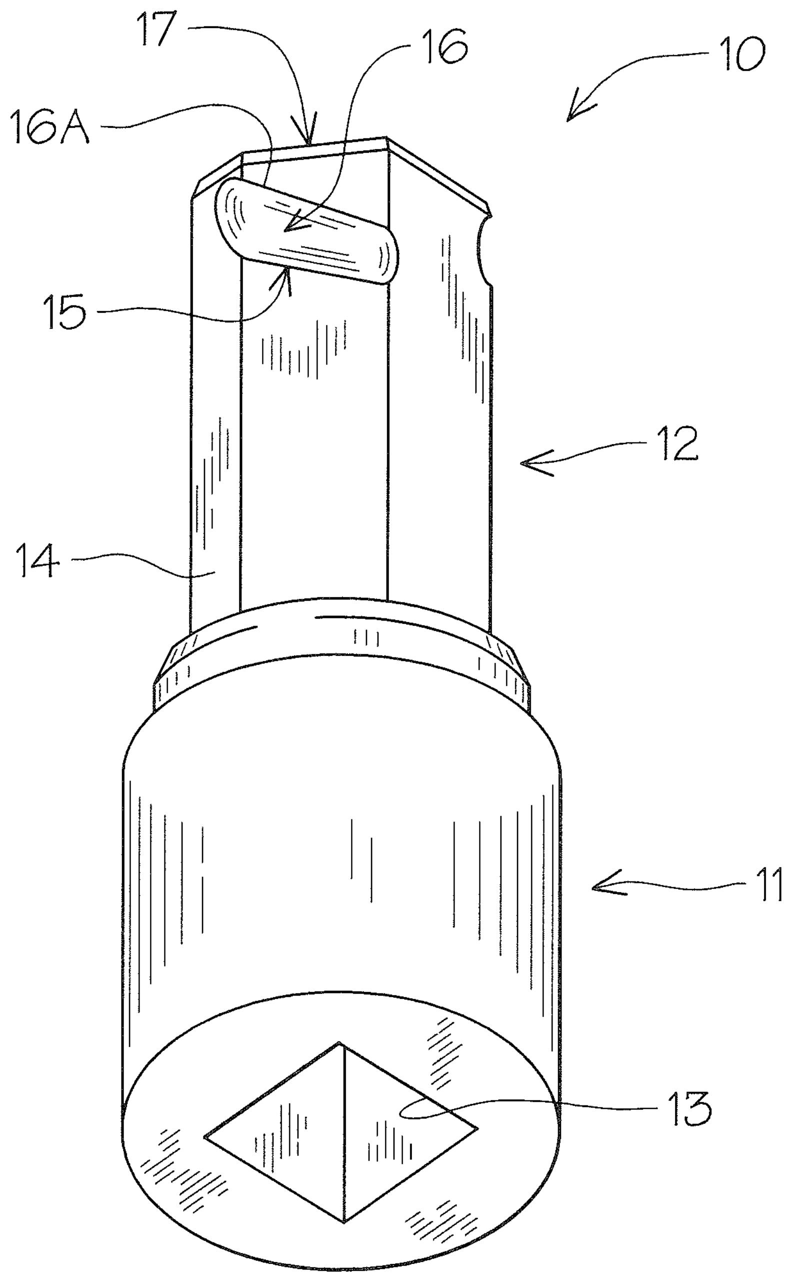
FIG. 7 is an enlarged bottom perspective view thereof.
Figure 8:
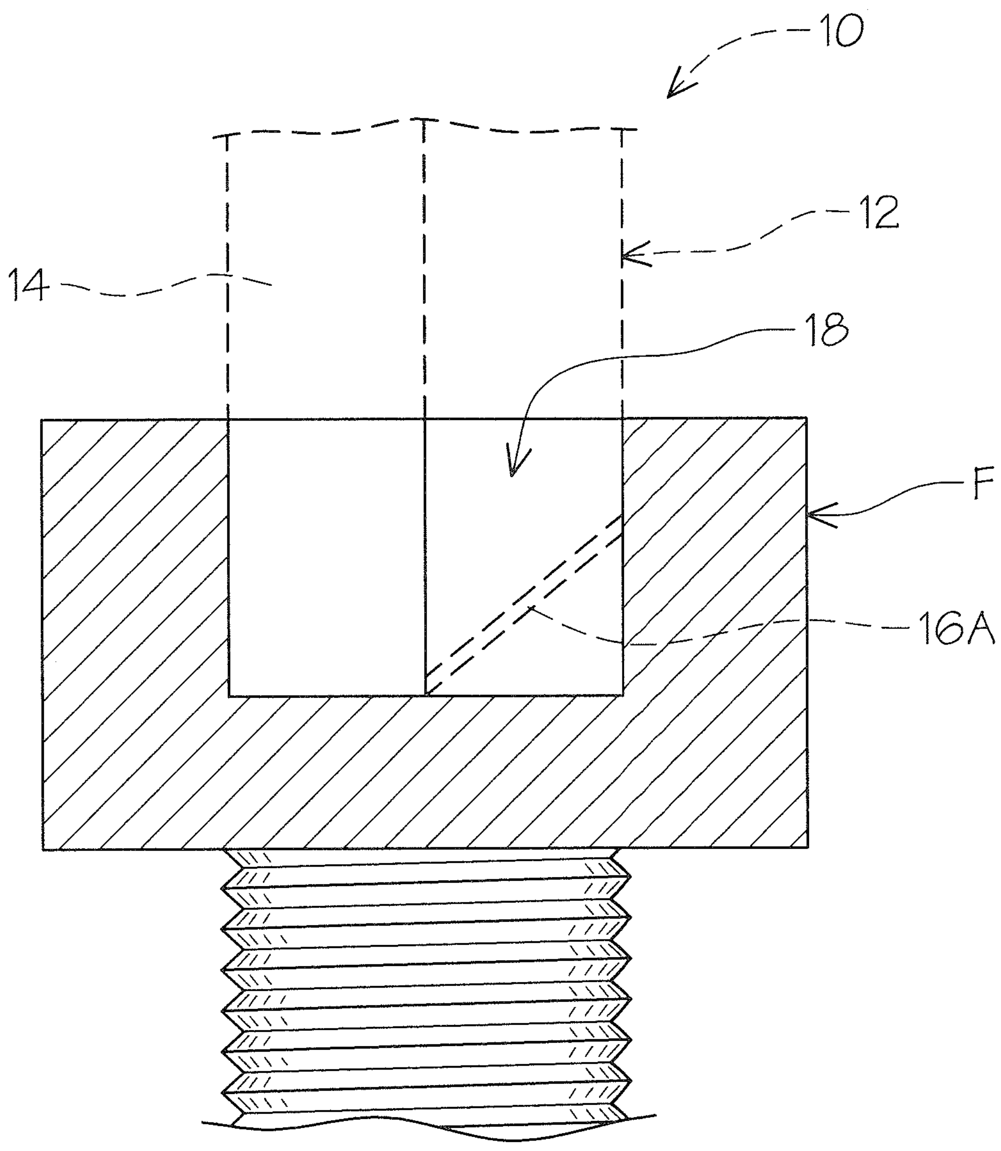
FIG. 8 is an enlarged graphic representation of the present invention engaged in a fastener illustrating points of contact in solid and broken lines.

A driver engagement socket 13, best seen in FIG. 8 of the drawings, extends into the cylinder screw bit body 11 and is shaped to receive a socket fitting member of a socket driver wrench, not shown, as will be evident to those skilled and well known in the art.

The hex engaged shank portion 12 has a plurality of elongated flat fastener engagement surfaces 14 of equal transverse and longitudinal dimension there about so as to define a hex tool bit configuration known within the art. The fastener engagement socket is therefore hexagonal with a plurality of flat engagement surfaces spaced radially about the longitudinal axis of the shank portion 12.

Some of the flat hex engagement surfaces 14 have a contoured C-shaped fastener engagement channel cut 15 therein. Each of the contoured engagement channel cuts 15 extend angularly across its respective hexagonal surface 14 having a contoured transverse tapered interior surface 16. The engagement channel cut 15 is also tapered longitudinally between respective opposing intersecting flat engagement surfaces 14A and 14B, best seen in FIG. 2 of the drawings.

The contoured transverse tapered interior surface 16 of the engagement channel cut 16 is of a modified C-shape defining a pair of upstanding elongated fastener engagement lateral edges 16A and 16B extending in angular spaced relation from the shank 12 fastener insert end 17. The so-configured engagement channel cut 15 being selectively cut in alternate engagement surfaces 14 about the hex bit 10 indirect contact thereby providing multiple points of enhanced non-slip fastener engagement as seen in FIG. 8 of the drawings graphically. This channel engagement orientation will thereby accommodate both undamaged and damaged fasteners, not shown, as will be discussed in greater detail hereinafter.

The contoured tapered interior surface 16 of each engagement channel cut 15 thereby defines both a primary fastener lateral engagement edge 16A and the secondary lateral edge 16B in spaced orientation thereby provides for the displacement of fastener material as needed during rotational engagement assuring a secure and active multiple point engagement regardless of the fastener's condition within the fastener's receiving area 18. The contoured tapered interior modified C-shape channel cut 16 is tapered transversely from the elongated primary fastener engagement lateral edge 16A upwardly to the so defined secondary fastener engagement lateral edge 16B as seen best in FIG. 7 of the drawings It will be seen that the hereinbefore described alternating placement of the unique contoured engagement channel cut 15 in three of the fastener engagement surfaces 14 thereby having a snug contact with the corresponding undamaged interior surfaces of the fastener's receiving area 18 and three engagement surfaces with the contoured center engagement channel cut 15 which work in concert to achieve an enhanced grip within the engagement fastener regardless of the relative fastener's condition as hereinbefore described.

During operation, the angular orientation of the contoured engagement channel cut 15's lateral edges 16A will engage within the fastener F and pull the hex bit 10 increasingly into the fastener's receiving area 18 thus maintaining the enhanced trilateral contact so achieved. It will be evident that the hex bit 10 engagement channel cut 15 will protrude inwardly towards the fastener at a corresponding scale percentage based on the size of the tool. It will also be apparent that the multiple contoured engagement channel cut 15's lateral edges 16A and 16B will allow during use "pivoting" of the hex bit tool 10 when the fastener engagement surfaces are compromised thus, as noted, forcing the hex bit tool to embed itself in the fastener to form a deeper and thereby better grip engagement with the compromised fastener.

This combination of flat engagement surfaces 14 with multiple selective positioning engagement channel cuts 15 will thereby provide multiple points of enhanced focus engagement regardless of fastener's condition in either rotational direction superior grip and hold currently unavailable within the art.

Referring now to FIGS. 9-12 of the drawings, an alternate anti-slip hex headed bit 20 can be seen having a cylindrical screw body 21 with a hex shank fastener engagement socket portion 22 extending therefrom. A drive engagement bore 23 is provided to receive a socket fitting of a socket driver, not shown, as set forth in the primary form of the invention.

Figure 9:
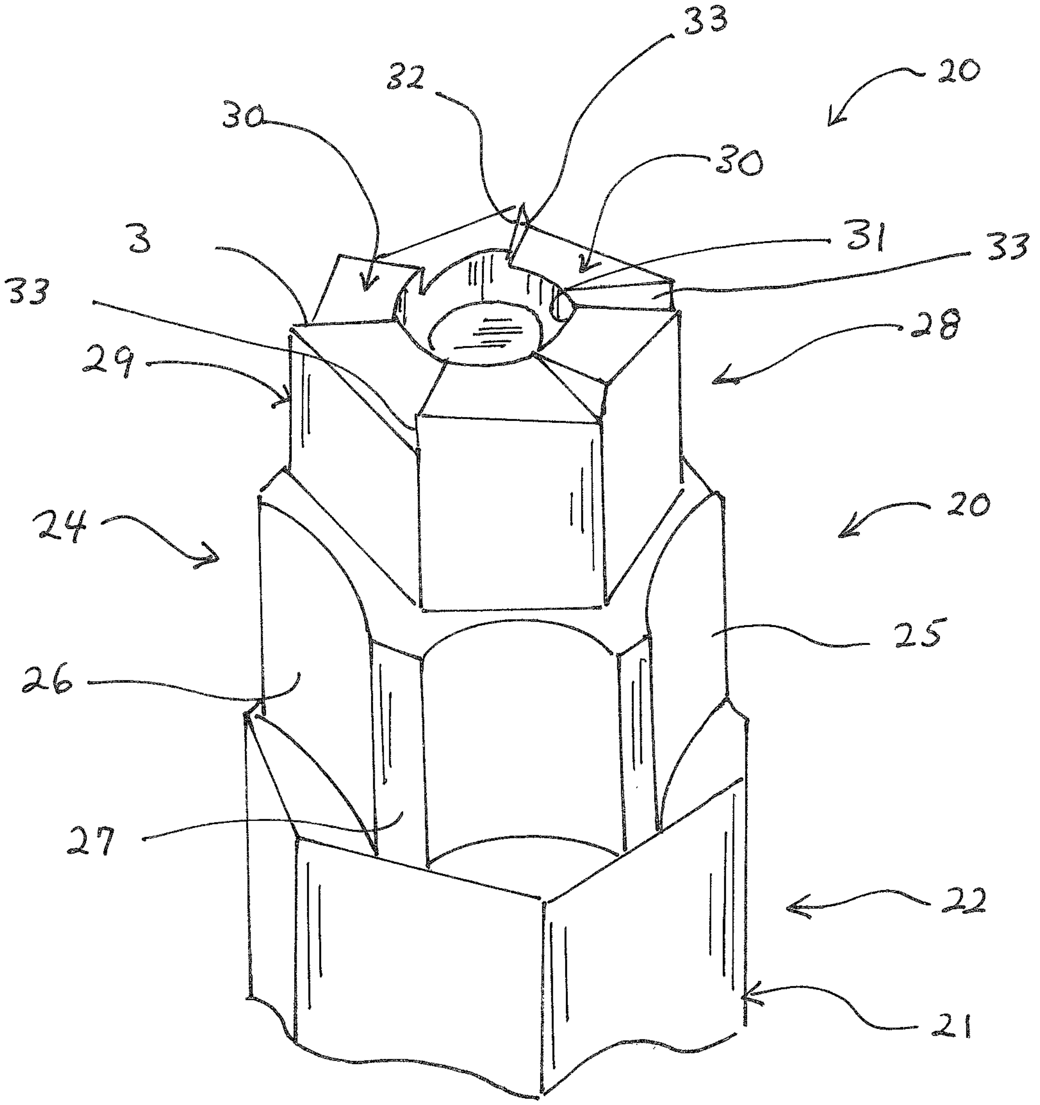
FIG. 9 is an enlarged top perspective view of an alternate end surface engagement anti-slip hex socket bit of the invention.

A hex shaft 24 extends from the hex shank fastener engagement socket portion 22 having a plurality of contoured hex engagement surfaces 25, each with a concave non-engagement surface 26 which defines flat hex engagement surfaces 27 there between, as best seen in FIG. 9 of the drawings. A second set of hex engagement surfaces 28 of directional flat hex angular dimension extend from the hex shank 24 defining a hexagonal insertion bit 29. Each of the respective hex engagement surfaces 28 are flat and have a contoured tapered end engagement surface 30 which are in transangular stepped relation to one another. The tapered end engagement surfaces 30 are terminated by an annular recess 31 within the hex bit as seen in FIGS. 9, 10 and 11 of the drawings in solid lines and dotted lines.

Figure 10:
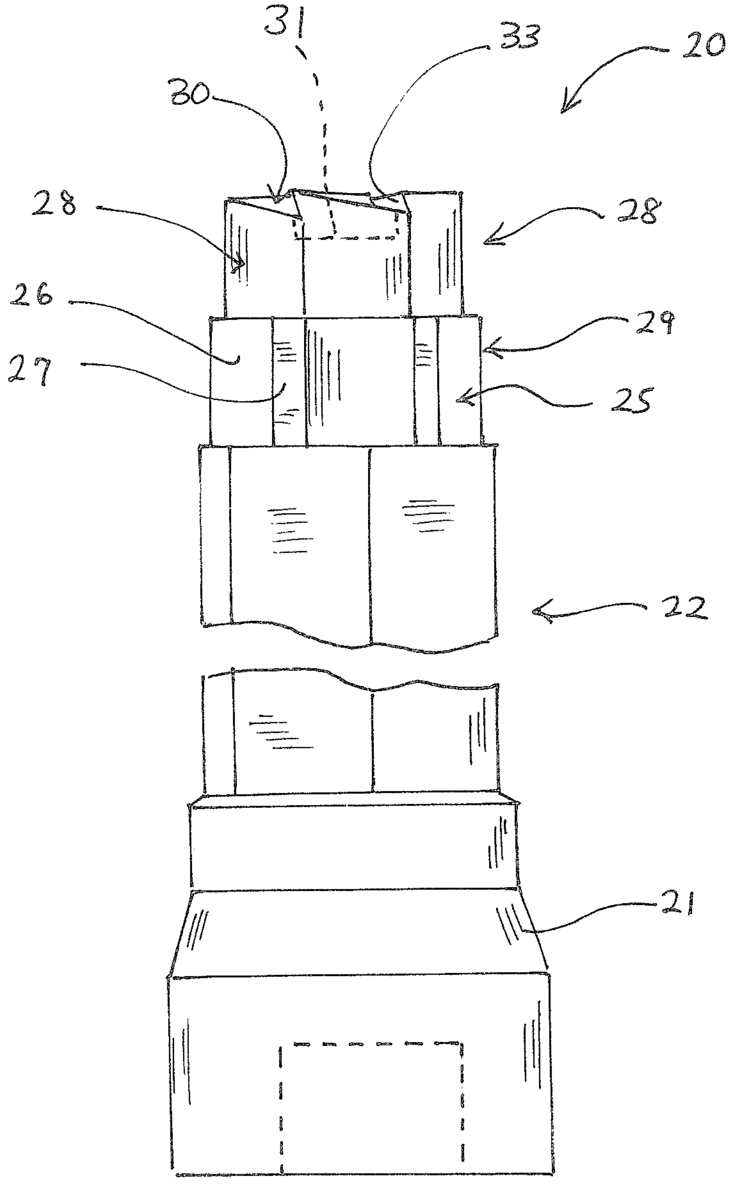
FIG. 10 is an enlarged front elevational view thereof.
Figure 11:
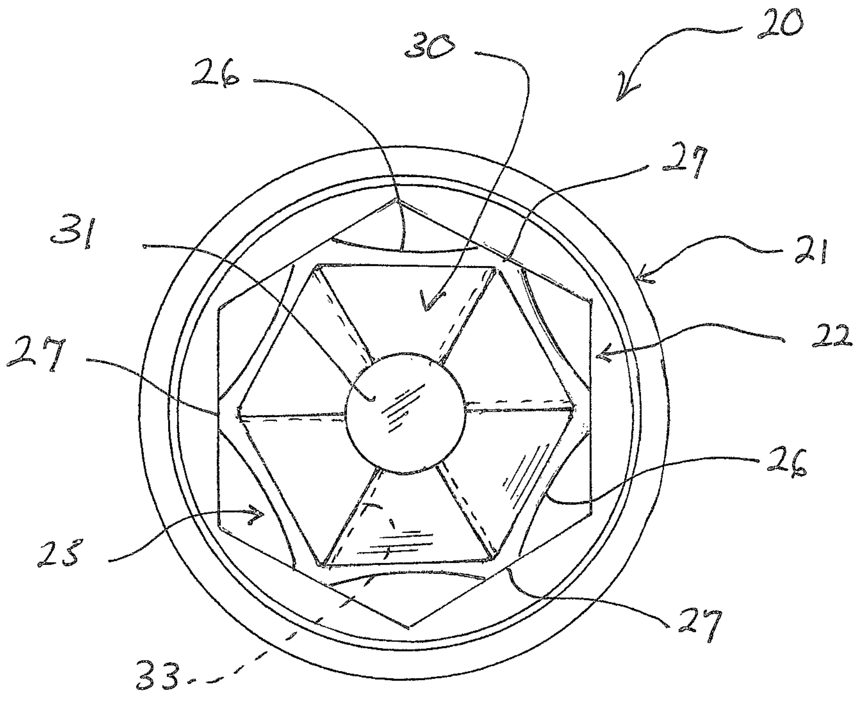
FIG. 11 is an enlarged top plan view thereof.

Each of the tapered end engagement surfaces 30 define an edge 32 which have an angular incline step surface 33 with a ten-degree vertical inclination illustrated at A in FIG. 10 of the drawings.

Figure 12:
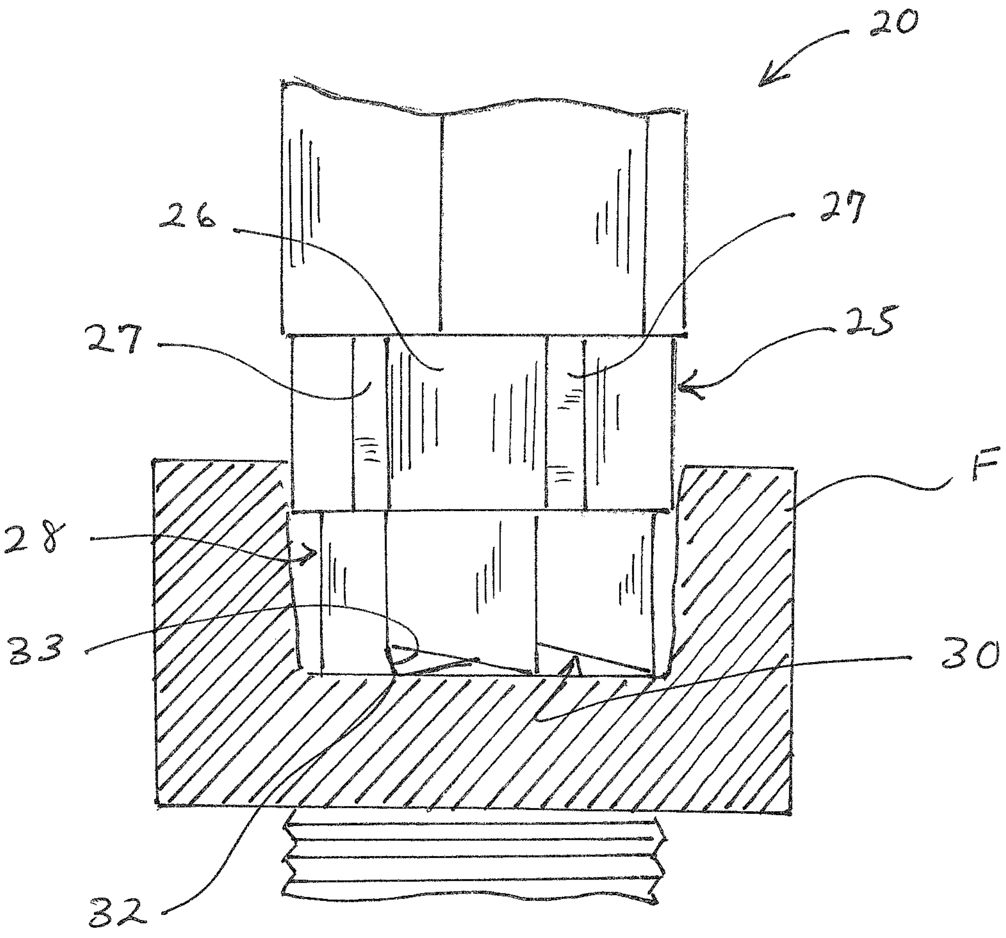
FIG. 12 is an enlarged graphic representation of the alternate form of the invention engaging in a damaged fastener illustrating point of end surface contacts.

Based on the foregoing, the corresponding end engagement edges 32 are on a horizontal plane for selective progressive engagement within a damaged fastener F interior surface 34 as seen graphically in FIG. 12 of the drawings. It will therefore be seen that the corresponding flat hex engagement surfaces 26 of the tool bit can engage an undamaged portion of the fastener F while the multiple end engagement edges 32 will engage the interior of the fastener F and upon rotation pull the hex tool bit progressively down into the fastener F enhancing the effective contact and rotational grip for rotational extraction of the fastener.

Referring now to FIGS. 13-16 of the drawings, a second alternate anti-slip hex headed bit 35 can be seen having a cylindrical screw body 36 with a hex shank fastener engagement socket portion 37 extending therefrom. A drive engagement bore 38 is provided to receive a socket fitting of a socket driver, not shown, as set forth in the primary form of the invention.

Figure 13:
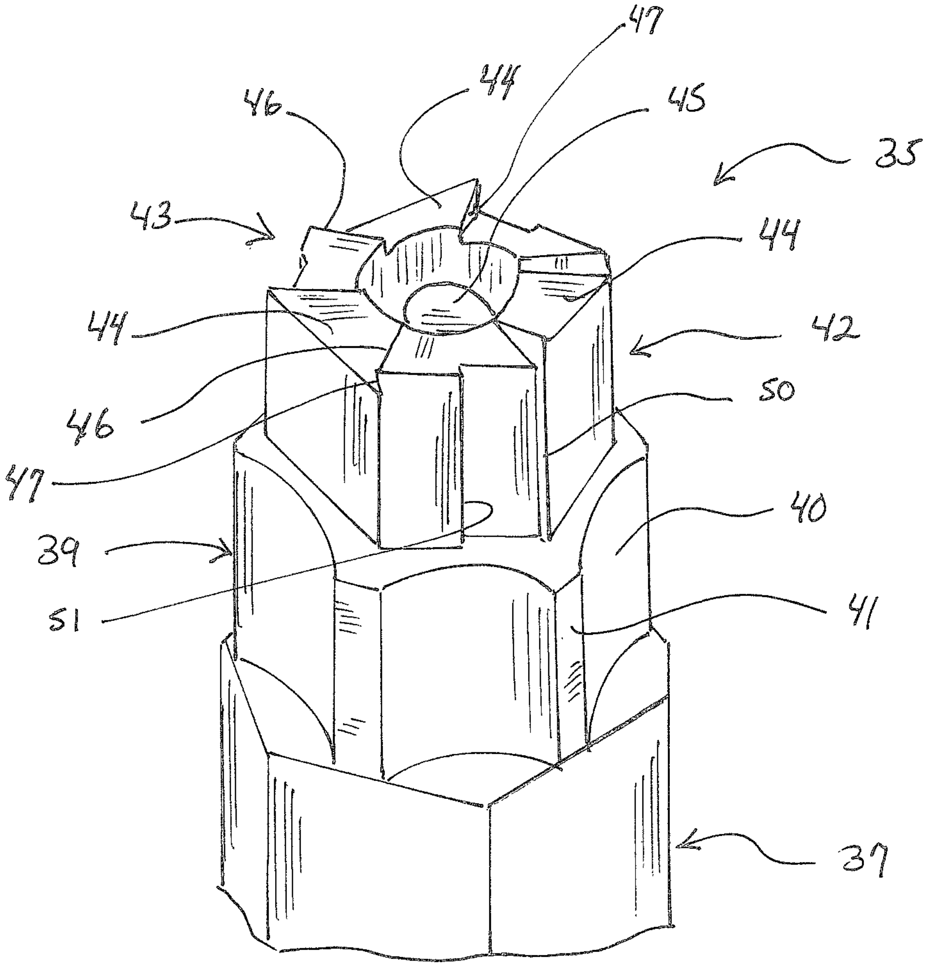
FIG. 13 is an enlarged top perspective view of a second alternate end surface engagement anti-slip hex socket bit of the invention.
Figure 14:
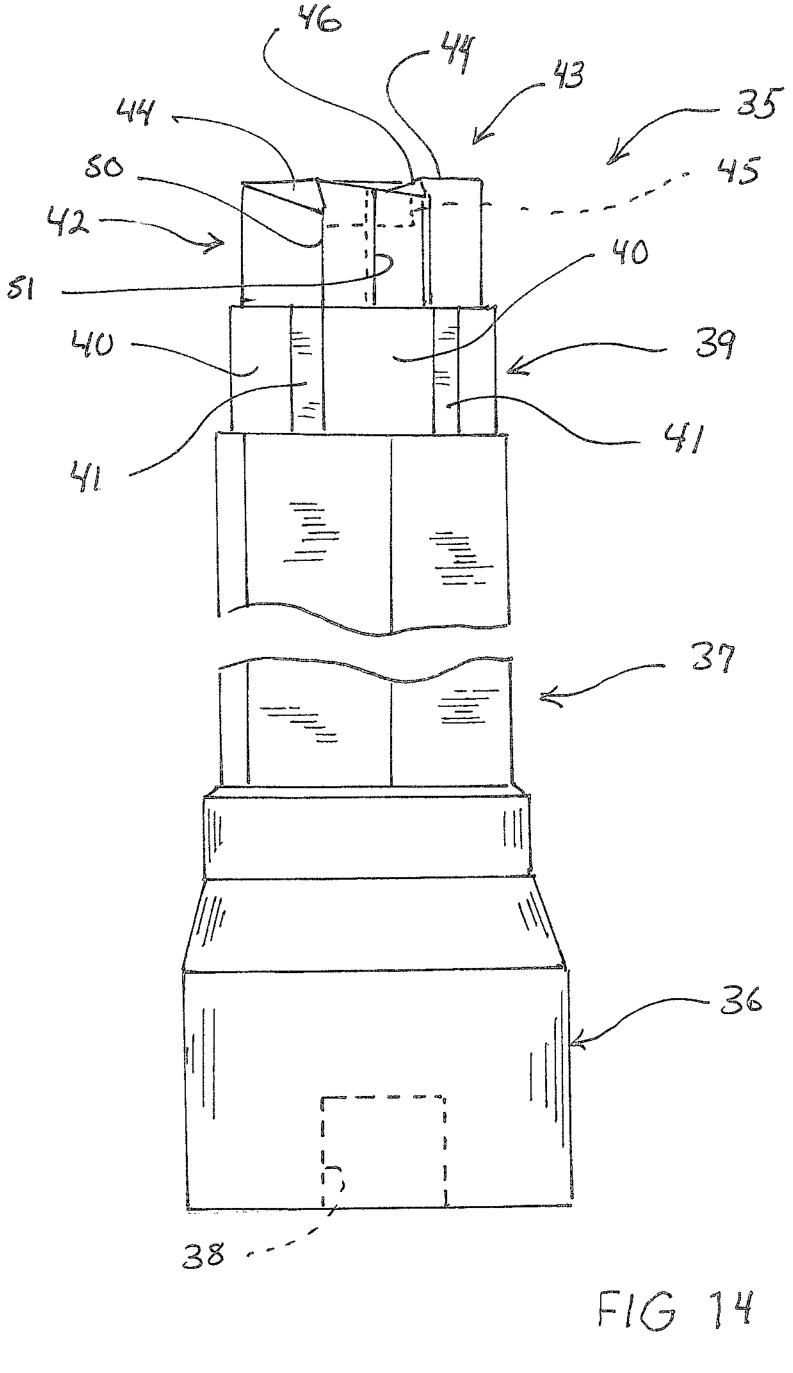
FIG. 14 is an enlarged front elevational view thereof.

A hex shaft 39 extends from the hex shank fastener engagement socket portion 37 having a plurality of contoured surfaces, each with a concave non-engagement surface 40 which defines flat hex engagement surfaces 41 there between, as best seen in FIG. 13 of the drawings. A second set of hex engagement surfaces 42 of hexagonal dimension extend from the hex shank 39 defining a hexagonal insertion bit 43. Each of the respective hex engagement surfaces 42 have a tapered end engagement surface 44 which are in trans-angular stepped relation to one another. The tapered end engagement surfaces 44 are terminated by an annular recess 45 there within the bit as seen in FIGS. 13 and 15 of the drawings.

Figure 15:
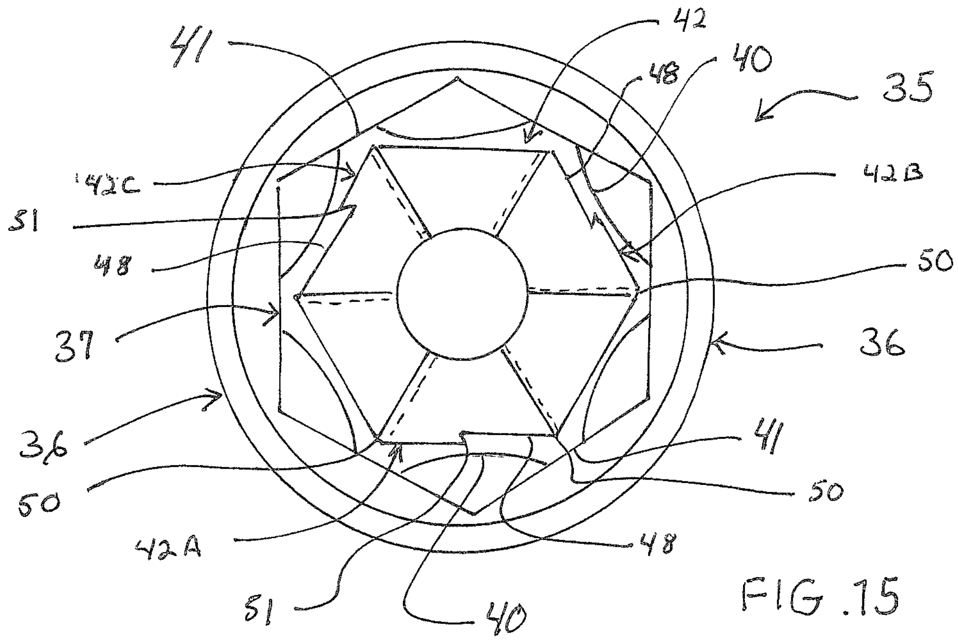
FIG. 15 is an enlarged top plan view thereof.

Each of the tapered end engagement surfaces 44 define an edge 46 which have an angular incline step surface 47 with a ten-degree vertical inclination illustrated in broken lines in FIG. 15 of the drawings.

It will be seen that alternating hex surfaces 42A, 42B and 43C in spaced relation to one another. Each of the alternate hex surfaces have a recess area 48 extending from the corresponding abutting hex engagement surface 42 intersections edges 50 to a mid-point therebetween. The recess areas 48 each have a vertical step edge 51 as seen best in FIGS. 13, 14 and 15 of the drawings. The vertical step edges 51 act as an additional fastener engagement edge along with the corresponding surface intersection defined edges at 30 as pairs of parallel spaced fastener engagement edges during use.

Figure 16:
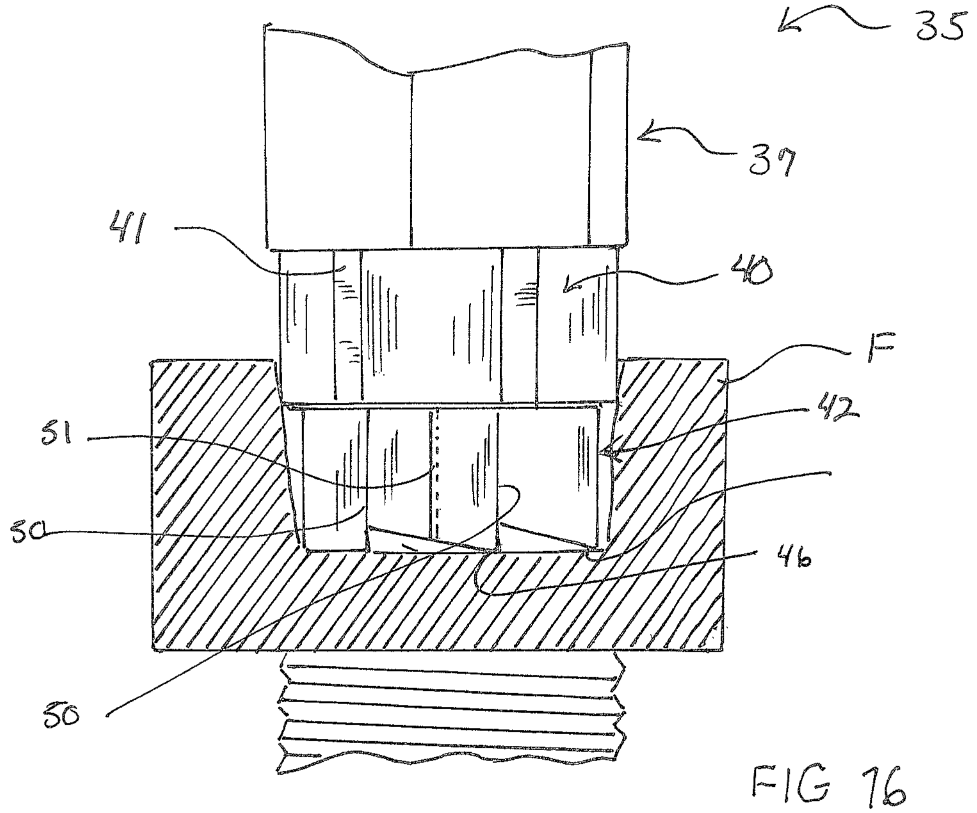
FIG. 16 is an enlarged graphic representation of the second alternate form of the invention engaged in a damaged fastener illustrating points of end surface and side surface engagement therein.

Referring now to FIG. 16 of the drawings, a damage fastener F can be seen graphically with the insertion of the second alternate anti-slip hex head bit 35. It will be evident that in addition to the corresponding end engagement edges 46, as hereinbefore described, the recessed areas 49 defining pairs of the vertical engagement edges 50 and 51 provide directional ascension edge engagement for enhanced purchase and rotational force orientation thereby again helping to draw the hex tool bit progressively into the fastener F for rotational removal of the damaged fastener as hereinbefore described.

It will thus be seen that a new and useful anti-slip socket wrench hex head bit configuration has been illustrated and described and it will be apparent to those skilled in the art that various changes and modifications may be made therein without departing from the spirit of the invention. Therefore, I claim:

The invention claimed is:

1. A directional multi-grip socket bit for hexagonal fasteners comprising, a screw bit body having a fastener engagement free end portion and a tool engagement end portion, a plurality of flat fastener engagement surfaces about said fastener engagement free end portion defining a hexagonal shank, a hex shaft extending from said fastener engagement free end portion having a plurality of concave hex surfaces defining flat fastener engagement surfaces there between, a plurality of secondary hex engagement surfaces extending from said concave hex surfaces, defining a hexagonal insertion bit, tapered end engagement surfaces on said secondary hex engagement surfaces, a plurality of end fastener engagement edges on said tapered end engagement surfaces, said end engagement edges extend radially from a central recess in the free end of said hexagonal insertion bit, said secondary hex engagement surfaces are of a dimension less than said fastener engagement free end portion diameter.

2. The directional multi-grip socket bit set forth in claim 1 wherein said tapered end engagement surfaces have inclined step surfaces there between defining said end engagement edges.

3. The directional multi-grip socket bit set forth in claim 2 wherein said inclined step surface is ten degrees.

4. The directional multi-grip socket bit set forth in claim 1 wherein said end fastener engagement edges are in planar relation to one another.

5. The directional multi-grip socket bit set forth in claim 1 wherein said tapered end engagement surfaces are flat extending from said respective end engagement edges.

6. The directional multi-grip socket bit set forth in claim 1 wherein said flat fastener engagement surfaces between said concave hex surfaces are in aligned planar relation to said respective hexagonal shank of said fastener engagement free end portion.

7. The directional multi-grip socket bit set forth in claim 1 wherein said hex engagement surfaces have alternating recesses therein defining spaced vertical engagement edges.

8. The directional multi-grip socket bit set forth in claim 7 wherein some of said vertical engagement edges have angular inclined step surfaces.

9. The directional multi-grip socket bit set forth in claim 7 wherein said vertical engagement edges are in spaced parallel relation to one another on each of said alternate hex surfaces.

* * * * *